Jan. 16, 1962 V. J. HAWKS 3,016,857
CONTROL CIRCUITS
Filed July 21, 1944

INVENTOR
V. J. HAWKS
BY
Walter C. Kiesel
ATTORNEY

United States Patent Office 3,016,857
Patented Jan. 16, 1962

3,016,857
CONTROL CIRCUITS
Verl J. Hawks, Mount Vernon, N.Y., assignor to Bell Telephone Laboratories, Incorporated, New York, N.Y., a corporation of New York
Filed July 21, 1944, Ser. No. 546,019
12 Claims. (Cl. 114—23)

This invention relates to control circuits and more particularly to anti-countermining protection circuits for signal actuated control systems for sonically guided torpedoes such as disclosed in the application Serial No. 538,-435, filed June 2, 1944, of Alton C. Dickieson, now Patent No. 2,997,970 of August 29, 1961.

Control systems of the type disclosed in the application above identified comprise, generally, a normally disabled steering system operable in accordance with submarine signals emanating from a ship to be attacked by the torpedo, and a trigger circuit for enabling the steering system when such a ship comes within the effective range of the torpedo. The trigger circuit comprises a hydrophone, which serves as the input element thereof, and is constructed and arranged to effect enabling of the steering system only when signals of a preassigned character, specifically signals characteristic of ships having such speeds that the torpedo can reach or overtake them, are received by the hydrophone.

In one specific form, the trigger circuit comprises a pair of transmission channels energized in common in accordance with signals received by the hydrophone, one of the channels, which may be designated as the operate channel, being adapted to pass only signals within a band of frequencies characteristic of the envelope of ship's noise of ships having speeds within a preassigned range and the other channel, which may be designated as the non-operate channel, being adapted to pass a somewhat higher band of frequencies. The two channels are substantially balanced for random submarine noise and the outputs thereof are combined in difference relation to produce a control signal. The enabler element for the steering system is controlled by the last mentioned signal in such manner that the element is operated only when the output of the operate channel exceeds that of the non-operate channel to at least a prescribed extent, whereby operation of the element by random submarine noise or by noise emanating from ships with speeds outside of the preassigned range is prevented.

In one particular trigger circuit, each of the channels includes a rectifier at the output end thereof and the direct current voltage resulting from the combined outputs is impressed upon the input circuit of an amplifier normally biased beyond cut-off, the polarities of the direct current voltages obtained being such that the voltage from the operate channel tends to overcome the blocking bias and the voltage obtained from the non-operate channel tends to increase the blocking bias. Thus, as will be apparent, a certain minimum output from the operate channel is requisite to effect operation of the amplifier and the enabler element, which is controlled thereby.

One object of this invention is to prevent operation of the trigger circuit to enable the steering system of explosive signal waves, such as are produced during countermining activities, which waves may contain components of frequencies which the operate channel is adapted to pass.

In accordance with one feature of this invention, means are provided for maintaining the output of the non-operate channel greater than that of the operate channel when explosion signal waves are produced in the general vicinity of the torpedo, whereby operation of the trigger circuit to enable the steering system is prevented.

More specifically, in accordance with one feature of this invention, in a trigger circuit of the particular form described above, an auxiliary circuit energized in accordance with the hydrophone output is provided for increasing the input to the rectifier in the non-operate channel relative to that to the rectifier in the operate channel only when explosion signals are received by the hydrophone.

The invention and the above noted and other features thereof will be understood more clearly and fully from the following detailed description with reference to the accompanying drawing in which.

Figure 1:
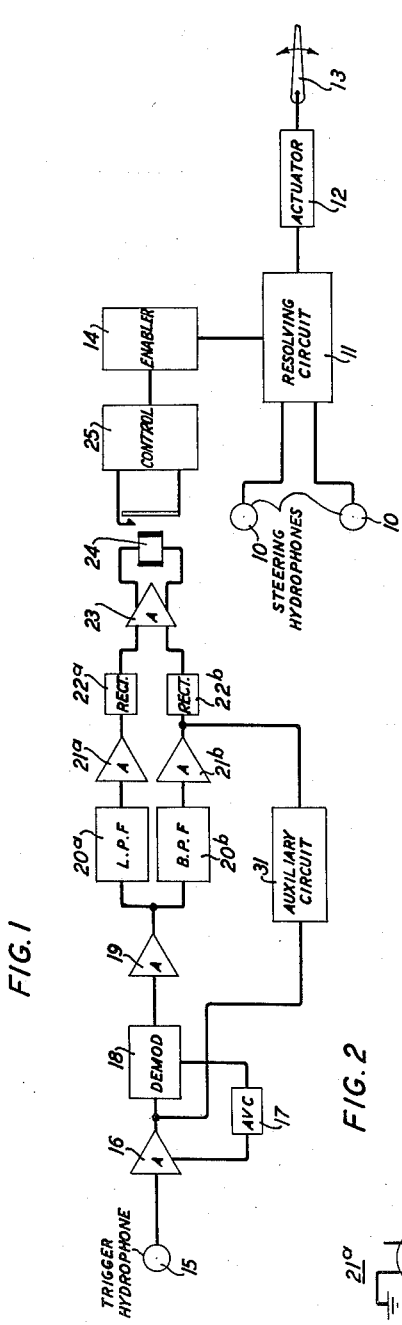
FIG. 1 is a functional schematic of a control circuit for a torpedo, illustrative of one embodiment of this invention.

Referring now to the drawing, the torpedo control circuit illustrated in FIG. 1 comprises a steering system, which may be of the construction disclosed in the application Serial No. 491,795, filed June 22, 1943, of Donald D. Robertson, including steering hydrophones 10 for receiving signals emanating from a ship, a resolving circuit 11 for converting the hydrophone outputs into a control signal related in polarity and amplitude to the direction and bearing of the ship with respect to the torpedo, and an actuator 12 for operating a rudder 13 in accordance with the control signal to guide the torpedo to the ship. The steering system normally is disabled and has associated therewith an enabler 14 controlled by a trigger circuit.

The trigger circuit comprises a hydrophone 15 connected to the input of an amplifier 16 adapted to be most sensitive to a preassigned band of frequencies, for example 4 to 6 kilocycles, and provided with automatic gain control 17 operated from a demodulator 18, for example of the copper oxide disc type, connected to the output of the amplifier. The low frequency demodulation products from the demodulator are supplied to a low frequency amplifier 19 and thence in common, to two signal channels.

Each of the signal channels comprises a filter 20 followed serially by an amplifier 21 and a rectifier 22, for example of the copper oxide disc type, the elements of the operate channel being designated in FIG. 1 by the appropriate reference numeral followed by the letter *a* and those of the non-operate channel being designated by the reference numeral followed by the letter *b*. The filter 20*a* is of the low pass type having a cut-off frequency for example of approximately 8 cycles, whereas the filter 20*b* is of the band-pass type having a pass band for example from 21 to 28 cycles. Thus, the operate channel will pass frequencies characteristic of the propeller frequencies of ships having four blade propellers and speeds up to about 20 knots, whereas the non-operate channel will transmit characteristic noise frequencies of ships having speeds greater than about 20 knots.

The output voltages of the two channels are combined in difference relation in the input circuit of a direct current amplifier 23 normally biased beyond cut-off and having a relay 24 in the output circuit thereof. The relay, when operated, closes the energizing circuit for a control element 25, and the latter, when energized, effects operation of the enabler 14.

The rectifiers 22 are so poled and associated with the amplifier 23 that the voltage obtained from the operate channel opposes the blocking bias on the amplifier and the voltage obtained from the non-operate channel aids this bias. The two channels are substantially balanced for random submarine noise so that for such noise and for signals of such character that the output of the non-operate channel is greater than that of the operate channel, the relay 24 and, hence, the enabler 14 are not operated. When, however, the output of the operate channel exceeds that of the non-operate channel to an extent sufficient to overcome the blocking bias, so that a requisite current is supplied to the relay 24, the relay operates and the steering system is enabled.

Thus, the trigger circuit discriminates between, on the one hand, noises of such character as are characteristic of ships having speeds within a preassigned range and, on the other hand, random noise and noises characteristic of ships having speeds outside of this range. Hence, false operation of the enabler in response to receipt by the hydrophone 15 of random submarine noise or noise emanating from ships which the torpedo cannot overtake is prevented. Details of the trigger circuit as thus far described are set forth fully in the above identified patent of Alton C. Dickieson.

It will be apparent that the posibility exists of false operation of the trigger circuit as described thus far by submarine signals other than those emanating from ships and of such character that substantial components thereof are within the pass band of the low pass filter 20a in the operate channel. For example, explosion waves such as are produced in countermining operations may be of this character. In accordance with one feature of this invention, means are provided for preventing such false operation of the trigger circuit.

Figure 3:
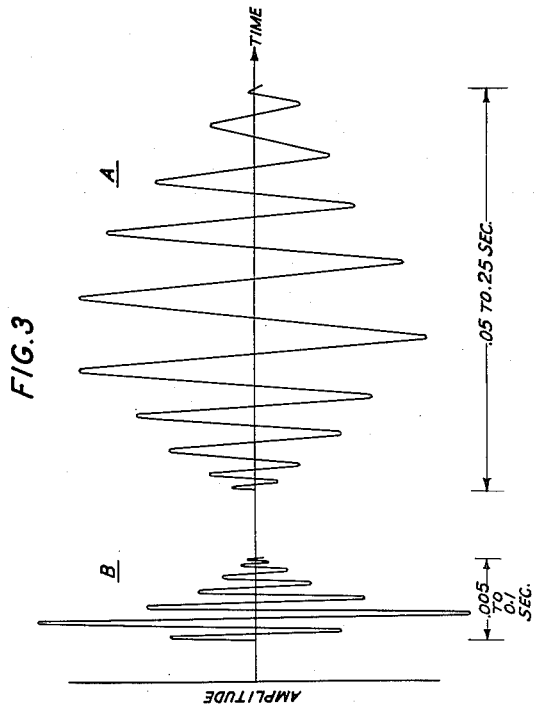
FIG. 3 is a graph illustrating typical and general wave forms for explosion and ship noise signals.

It has been determined that explosion signals and ship signals have different attributes of such nature as to provide a basis for discrimination between them whereby the trigger circuit will be ineffective to operate the enabler 14 in response to explosion waves received by the hydrophone 15, but its efficacy in response to ship signals of the prescribed character will be unimpaired. A ship signal as received by the hydrophone 15 and amplified by the amplifier 16 comprises high frequency components substantially modulated at the propeller frequency of the ship. As an illustration, for an amplifier of the specific character described above, the output for ship signals received by the hydrophone 15 may be considered in idealized form as a 5 kilocycle signal modulated at propeller frequency, for example between 2 and 10 cycles per second. As will be pointed out hereinafter, the rectifier 22 and demodulator 18 may be of the half-wave type so that the useful part of the ship signal, that is the portion utilized in the trigger circuit, produces an output pulse for the operate channel of .05 to 0.25 second duration depending upon the propeller frequency. The form of the idealized ship signal wave is illustrated by graph A in FIG. 3. For explosion signals, the length of the pulses obtained is of the order of 0.005 to 0.1 second depending upon such factors as the number of reflections of the wave and the reflection losses that exist. A typical, somewhat simplified explosion wave is illustrated by graph B in FIG. 3.

Figure 2:
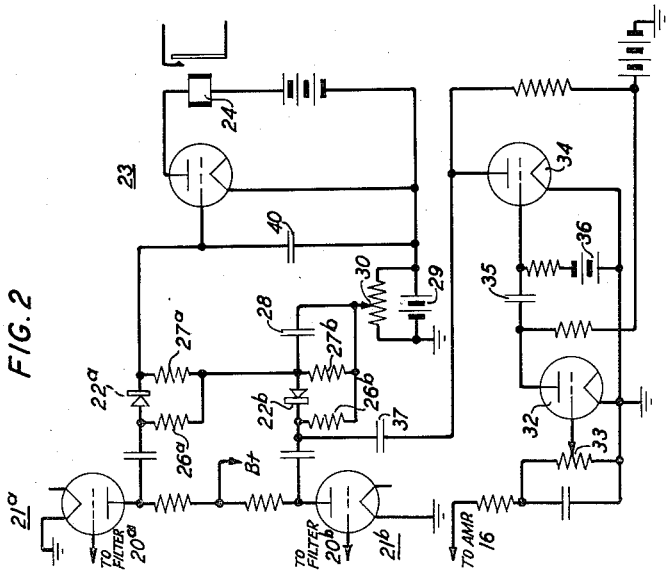
FIG. 2 is a detailed circuit diagram of a portion of the circuit illustrated in FIG. 1 showing in particular the auxiliary circuit and the association thereof with the non-operate channel.

It will be seen from the foregoing that the energy in a pulse due to a ship signal is greater than, actually several times as great as, the energy in a pulse due to an explosion signal, assuming equal frequency of pulses and equal peak voltages. Hence, if the trigger circuit, and particularly the parameters of the direct current amplifier and relay are made such that at least a minimum peak voltage of ship signal pulse is requisite to cause operation of the relay, the peak voltage due to an explosion pulse which would be required to cause such operation would be several times the peak voltage of ship signal pulse. This difference in the character of the two types of pulses is utilized, in accordance with a feature of the invention, to disable the amplifier 23 in response to receipt of explosion signals by the hydrophone 15 before integrations of the explosion signals at the input to the amplifier 23 can result in operation of the relay 24, without impairing operation of the circuit by ship signals. An illustrative circuit for this purpose is shown in FIG. 2.

As illustrated in this figure, the amplifiers 21 comprise similar electron discharge devices in the anode circuits of which the rectifiers 22 are connected, the rectifiers being oppositely poled and bridged by similar resistances 26 and 27. A condenser 28 serves as a common alternating current return for the two amplifiers 21. The resistors 27a and 27b are connected in series with one another in the grid circuit of the direct current amplifier 23, the latter circuit including also the biasing source 29 and an adjustable portion of the resistance 30, and a grid condenser 40. As is apparent, the direct current potential across the resistor 27a, which is proportional to the potential across the rectifier 22a, is of such polarity as to oppose the biasing potential due to the source 29 whereas the potential across the resistor 27b, which is proportional to the voltage across rectifier 22b, is of such polarity as to aid the biasing potential. The bias due to the source 29 is such that the amplifier will be enabled to pass sufficient current for operation of the relay 24 only when the voltage appearing across resistance 27a is of at least a prescribed magnitude.

The disabling of the amplifier 23 in response to explosion signals received at the hydrophone 15 is effected by an auxiliary circuit 31 comprising an amplifier device 32, the input circuit of which is connected to the output side of the amplifier 16 through a potentiometer resistance 33. The anode of the device 32 is connected to the grid of a second amplifier device 34 by way of a suitable condenser 35, the grid of the device 34 being biased beyond cut-off as by a battery 36. The anode of the device 34 is connected to the rectifier 22b by way of a suitable blocking condenser 37 as shown. The blocking bias provided by the source 36 is made such that the device 34 will be rendered conductive only when the peak voltage, due to a signal received at the hydrophone 15, impressed upon the input circuit for the device 34 is of at least a prescribed amplitude. The amplifier 32, 34, it will be noted, is energized in accordance with the output of the amplifier 16 and advantageously has a substantially flat characteristic over the band of frequencies to which the amplifier 16 is most efficient.

When signals, due to either ships or explosions, are received by the hydrophone 15, a portion of the output of the amplifier 16 is fed to the auxiliary circuit 31 and the remainder, after demodulation, is supplied to the two channels of the trigger circuit. The operate and non-operate channels transmit signals within the pass bands of the respective filters, to the associated rectifiers. The auxiliary circuit is substantially non-discriminatory with respect to frequencies in the output of the amplifier 16 so that it translates frequencies within the pass band of the filter 20a as well as those outside of this band. For ship signals of peak amplitudes above a preassigned minimum and below that required for operation of the device 34 in the auxiliary circuit, the direct current voltage obtained from the operate channel will be sufficient to overcome the blocking bias on the amplifier 23, whereby the relay 24 is operated and the steering system is enabled. For explosion signals of peak amplitudes sufficient to effect operation of the device 34, however, the input to the rectifier 22b is increased relative to that to the rectifier 22a so that the resultant direct current voltage applied to the grid of the amplifier 23 is such as to maintain the amplifier 23 disabled.

It will be appreciated that because of the difference in energy in explosion and ship signals, due to the marked difference in pulse lengths for the two types of signals as noted hereinabove, the minimum peak amplitude of ship signals requisite to cause operation of the amplifier 23 is much less than the amplitude of explosion signals which would be required to cause operation of this amplifier. Thus, the auxiliary circuit 31 may be constructed readily so that ship signals of amplitudes considerably above the minimum requisite to effect operation of the amplifier 23 will be below the minimum signal amplitude necessary to render the device 34 in the auxiliary circuit conductive.

Although in the system illustrated and described, the auxiliary circuit 31 has its input side connected to the output of the high frequency amplifier 16, it may be connected to other points in the trigger circuit, for example to the output side of the low frequency amplifier 19. It appears preferable, however, to connect the auxiliary circuit as shown and described for the reason that at the output of the amplifier 16, the difference between explosion and ship signal pulses is most pronounced.

Reference is made of the application Serial No. 538,525, filed June 2, 1944, of Paul G. Edwards, now Patent No. 2,995,100 of August 8, 1961, wherein a system related in some respects to this invention is disclosed and claimed.

Although a specific embodiment of this invention has been shown and described, it will be understood that it is but illustrative and that various modifications may be made therein without departing from the scope and spirit of this invention as defined in the appended claims.

What is claimed is:

1. A control circuit comprising a hydrophone, a first signal channel including a filter adapted to pass only frequencies characteristic of the envelope of noise of ships having speeds within a preassigned range, a second signal channel including a filter adapted to pass a band of frequencies other than said characteristic frequencies, said channels being energized in common in accordance with the output of said hydrophone and substantially balanced for random submarine noise received by said hydrophone, means for resolving the outputs of said channels into a difference signal, means controlled by said difference signal to operate only when the output of said first channel exceeds that of said second channel, and means for preventing operation of said controlled means in response to explosion signals received by said hydrophone, said last means comprising auxiliary circuit means adapted to translate signals of said characteristic frequencies and energized in accordance with the output of said hydrophone for increasing the output of said second channel relative to that of said first channel and including an enabling element operable only in response to signals received by said hydrophone of amplitude greater than that requisite to produce an output from said first channel sufficient normally to effect operation of said controlled means.

2. A control circuit comprising a hydrophone, a pair of signal channels energized in common in accordance with the output of said hydrophone, one of said channels being adapted to transmit only a prescribed band of low frequency signals and the other of said channels being adapted to transmit signals in a different band of frequencies, means for combining the outputs of said channels in difference relation, means controlled in accordance with the resultant of the combined outputs of said channels to operate only when the output of said one channel exceeds that of the other, and means responsive to explosion signals within said prescribed band of frequencies and of intensity greater than that requisite to result in operation of said controlled means by said resultant for increasing the output of said other channel relative to that of said one channel.

3. A control circuit comprising a hydrophone, a first signal channel for transmitting only a prescribed band of frequencies, a second signal channel for transmitting a different band of frequencies, means for energizing said channels in common in accordance with the output of said hydrophone, means for resolving the outputs of said channels in combination into a difference signal, means controlled in accordance with said difference signal to operate only when the output of said first channel is greater than that of said second channel, and an auxiliary circuit capable of translating signals of frequencies within said prescribed band and of at least a minimum preassigned amplitude greater than the signal amplitude requisite to result in operation of said controlled means by said difference signal, connected between said hydrophone and the output end of said second signal channel.

4. A control circuit comprising a hydrophone, a pair of signal channels energized in common in accordance with the output of said hydrophone, one of said channels being adapted to pass only a preassigned band of frequencies and the other of said channels being adapted to pass only a different band of frequencies, said channels being substantially balanced for random submarine noise signals received by said hydrophone, means for combining the outputs of said channels in difference relation, means controlled in accordance with the resultant of the combined outputs to operate only when the output of said one channel exceeds that of said other channel, and an auxiliary circuit energized in accordance with the output of said hydrophone and including an electron discharge device the output circuit of which is connected to said other channel and means biasing said device beyond cut-off such that the device is rendered conductive when signals within said preassigned band and of at least a preassigned amplitude greater than that requisite to result normally in operation of said controlled means are received by said hydrophone.

5. A control circuit comprising a hydrophone, operating means, means for normally disabling said operating means, enabling means energized in accordance with the output of said hydrophone for overcoming said disabling means when signals of at least a preassigned amplitude and characteristic of ships having speeds within a preassigned range are received by said hydrophone, and means energized separately from said enabling means and in accordance with the output of said hydrophone for rendering said enabling means ineffective when explosion signals having components similar to said characteristic signals and of amplitude greater than said preassigned amplitude are received by said hydrophone.

6. A control circuit comprising a hydrophone, an amplifier, means normally biasing said amplifier beyond cut-off, enabling means including a signal channel energized in accordance with the output of said hydrophone for overcoming the normal bias on said amplifier, said channel being capable of passing only frequencies characteristic of the envelope of ship's noise for ships having speeds within a preassigned range, and auxiliary circuit means energized in accordance with the output of said hydrophone capable of passing signals of said frequency for rendering said enabling means ineffective when explosion signals of intensity normally sufficient to result in overcoming of said bias are received by said hydrophone.

7. A control circuit comprising a first signal channel adapted to pass only a band of frequencies corresponding to the propeller frequencies of ships having speeds within a preassigned range, a second signal channel adapted to pass another band of frequencies, a hydrophone, an amplifier therefor, said channels being energized in common in accordance with the output of said amplifier and each channel including a rectifier at the output end thereof, means for combining the outputs of said channels in difference relation, means controlled in accordance with the resultant of the combined outputs of said channels to operate only when the output of said first channel is of at least a certain value relative to that of said second channel, and an auxiliary circuit connected between the output of said hydrophone and the rectifier in said second channel and including means for closing the auxiliary circuit when signals within said first band and of at least a preassigned amplitude greater than that requisite to produce an output of said certain value from said first channel are received by said hydrophone.

8. A control circuit in accordance with claim 7 wherein said auxiliary circuit comprises an electron discharge device normally biased beyond cut-off, having its input circuit coupled to said amplifier and having its output circuit coupled to said rectifier in said second channel.

9. In combination, a signal translating device, a first signal channel adapted to pass a preassigned band of frequencies, a second signal channel adapted to pass a different band of frequencies, said channels being energized in common in accordance with the output of said device, means for resolving the outputs of said channels in combination into a difference signal, operating means controlled in accordance with said difference signal, and means energized in accordance with the output of said device for increasing the output of said second channel relative to that of said first channel when signals within said preassigned band and of amplitude greater than that requisite to result in control of said operating means in accordance with the output of said first channel are received by said device.

10. In combination, a signal translating device, a first signal channel adapted to pass only a preassigned band of frequencies, a second signal channel including a filter for restricting the frequencies passed by said second channel to a different band of frequencies, each of said channels including a rectifier at the output end thereof, means for energizing said channels in common in accordance with the output of said signal translating device, means for combining the outputs of said channels in difference relation, means energized in accordance with the resultant of the combined outputs, and an auxiliary amplifier connected between said device and the rectifier in said second channel and biased beyond cut-off such that said amplifier is enabled only when signals of at least a preassigned intensity greater than that of frequencies in said band requisite to effect control of said energized means in accordance with the output of said first channel are received by said device.

11. A control circuit comprising a hydrophone, a high frequency amplifier for which said hydrophone constitutes the input element, a demodulator connected to the output side of said amplifier, a first signal channel adapted to pass only signals within a preassigned band of frequencies and including a rectifier at the output end thereof, a second signal channel adapted to pass a different band of frequencies and including a rectifier at the output end thereof, a direct current amplifier normally biased beyond cut-off and having an input circuit upon which the direct current voltages of the two rectifiers are impressed in difference relation, the direct current voltage of the rectifier in said first channel being of the polarity tending to overcome the bias on said direct current amplifier, means connecting the input ends of both channels to the output of said demodulator, and an auxiliary circuit connected between the output side of said high frequency amplifier and the rectifier in said second channel for preventing operation of said direct current amplifier by explosion signals having component frequencies within said preassigned band, said auxiliary circuit including a high frequency amplifier having an electron discharge device normally biased beyond cut-off such that the amplifier is enabled only when signals of intensity greater than that normally sufficient to render said direct current amplifier conductive are received by said hydrophone.

12. A control circuit comprising means for translating signals within a band of frequencies, operating means, a circuit for energizing said operating means in accordance with the input voltage applied to said circuit, and means for controlling said circuit to effect operation of said operating means only in response to receipt by said translating means of signal pulses containing certain frequencies within said band and having an energy content within prescribed limits, said controlling means comprising a first resolving means for converting all signal pulses containing said certain frequencies received by said translating means into a first control voltage, a second resolving means for converting signal pulses containing certain frequencies into a second control voltage, said second resolving means being operable to convert only signal pulses of at least a minimum preassigned amplitude, and means for applying said first and second control voltages in difference relation to said control circuit.

References Cited in the file of this patent
UNITED STATES PATENTS

| | | |
|---|---|---|
| 1,709,554 | Black | Apr. 16, 1929 |
| 1,801,657 | Buyko | Apr. 21, 1931 |
| 1,968,068 | Blancard et al. | July 31, 1934 |
| 2,040,850 | Hubbard | May 19, 1936 |
| 2,368,953 | Walsh | Feb. 6, 1945 |

FOREIGN PATENTS

| | | |
|---|---|---|
| 495,925 | Germany | Apr. 11, 1930 |